United States Patent
Matsuoka et al.

[15] 3,700,374
[45] Oct. 24, 1972

[54] CONTINUOUS MIXER WITH SCREW DISCHARGE CONTROL

[72] Inventors: James T. Matsuoka, Brecksville; Armindo Cantarutti, Akron, both of Ohio

[73] Assignee: Intercole Automation, Inc., Cleveland, Ohio

[22] Filed: July 14, 1969

[21] Appl. No.: 841,349

[52] U.S. Cl. ................. 425/208, 425/144, 259/192
[51] Int. Cl. ............................................... B29f 3/02
[58] Field of Search .......... 259/6, 7, 9, 10, 25, 26, 41, 259/42, 45, 46, 192; 18/2 HA, 2 EP; 264/40; 425/208, 144

[56] References Cited

UNITED STATES PATENTS

| | | |
|---|---|---|
| 3,154,808 | 11/1964 | Ahlefeld, Jr. et al. ....... 18/2 EP |
| 3,111,707 | 11/1963 | Buckley ................... 18/2 HA |
| 3,148,231 | 9/1964 | Spencer .................... 18/2 HA |
| 3,447,201 | 6/1969 | Seanor et al. .............. 18/2 HA |
| 2,868,517 | 11/1959 | Lasch ............................ 259/6 |
| 3,023,455 | 3/1962 | Geier et al. ................. 259/9 X |
| 3,333,828 | 8/1967 | Boehme ......................... 259/9 |
| 3,343,922 | 9/1967 | Zimmer et al. ............. 257/6 X |
| 3,348,815 | 10/1967 | Edick ............................ 259/6 |
| 3,387,826 | 6/1968 | Loomans ....................... 259/6 |
| 3,505,085 | 4/1970 | Straughn et al. ........... 259/9 X |

*Primary Examiner*—Andrew V. Kundrat
*Attorney*—Watts, Hoffmann, Fisher & Heinke

[57] ABSTRACT

An internal mixer with parallel mixing rotors and a screw controlled discharge. The material discharge rate is controlled by operation of a screw in a conduit from the mixing chamber through which mixed material is discharged. Preferably, the screw is a part of a screw-type extruder and further conditions and extrudes the material.

18 Claims, 9 Drawing Figures

PATENTED OCT 24 1972

INVENTORS.
JAMES T. MATSUOKA
BY ARMINDO CANTARUTTI
Watts, Hoffmann,
Fisher & Heinke
ATTORNEYS.

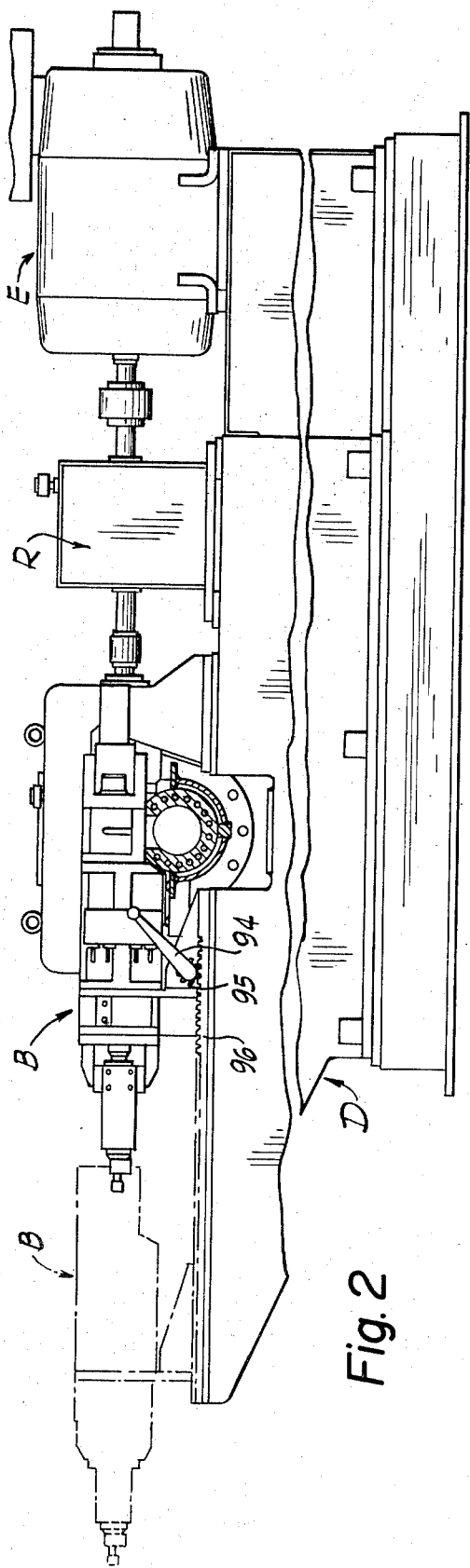
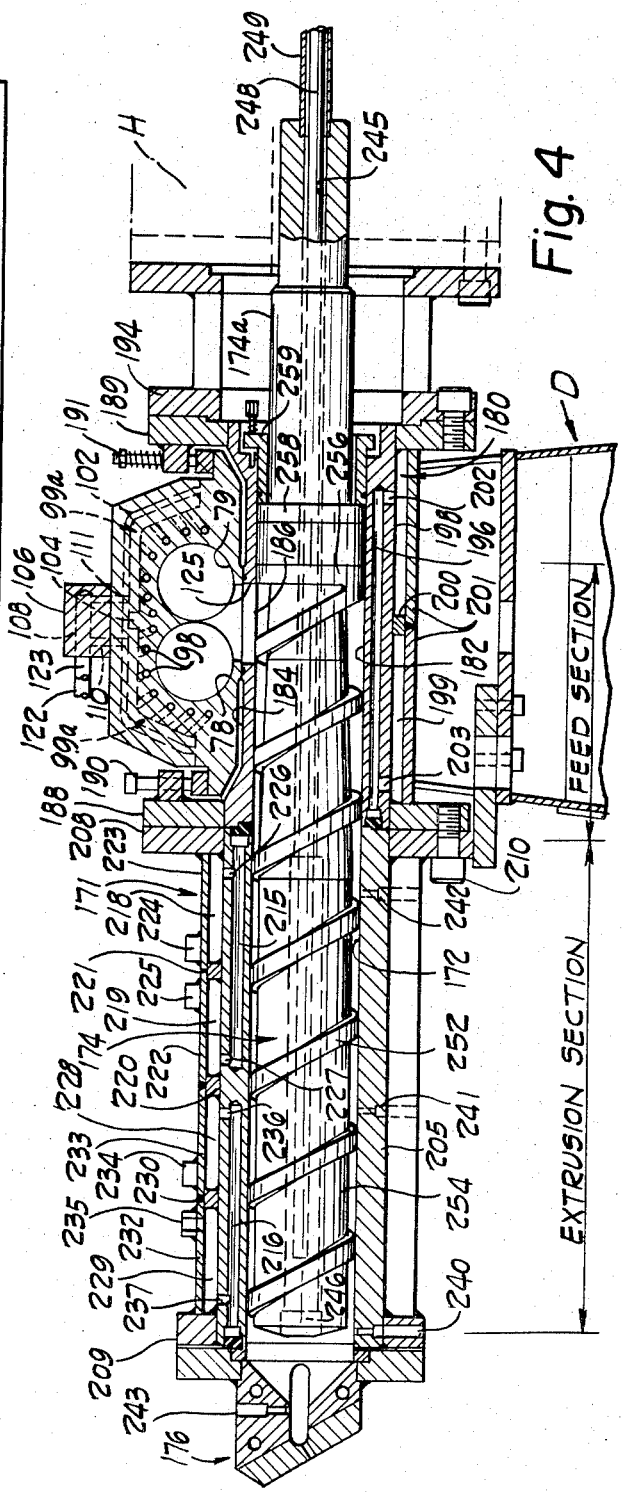

INVENTORS
JAMES T. MATSUOKA
ARMINDO CANTARUTTI
BY Watts, Hoffmann,
Fisher & Heinke
ATTORNEYS

CONTINUOUS MIXER WITH SCREW DISCHARGE CONTROL

FIELD OF THE INVENTION

This invention relates to a internal mixer for mixing materials such as rubber, plastic and the like, and more particularly to a continuous mixer with twin rotors and a screw-controlled discharge.

PRIOR ART

Internal mixers for continuously mixing materials within a chamber by the action of parallel rotors are known as exemplified in U.S. Pat. No. 3,154,808.

SUMMARY OF THE INVENTION

The present invention comprises improved methods of and apparatus for establishing desired mixing conditions in a continuous mixer by positively conveying at a controlled rate mixed material from the mixing chamber. In accordance with this invention a rotated screw in a discharge conduit controls the rate of discharge by the speed of screw rotation. Advantageously, the screw also functions as an extruder rotor to further condition and extrude the material through an extrusion die.

In a preferred embodiment of this invention, a continuous mixer is provided with two parallel bladed rotors in longitudinally communicating side-by-side cylindrical portions of a mixing chamber, with an inlet at one end of the chamber and an outlet at the other. The mixing blades of the rotors are constructed to move material back and forth within the chamber during mixing. Material throughflow rate is determined by the rate at which the discharge screw is rotated.

Each rotor includes, in axial relationship, a screw input or material feeding portion, a central mixing portion with blade portions that twist in opposite directions to mix material within the portion of the cylindrical chambers, and a screw output portion in the output portion of the cylindrical chambers just beyond the mixing chamber. The screw output portion in part helps to advance mixed material to the discharge opening, and serves to dampen pulsating load requirements on the rotor drive, characteristic of bladed mixers.

Each rotor is formed with what would be considered a central, generally cylindrical, body portion, and the mixing portion of each rotor has blades formed in a generally continuous rotor surface. While blades of various construction can be used, it is advantageous and preferred to utilize first and second pairs of blades on the mixing portion of each rotor extending inward toward the center of the mixing portion, from opposite ends. The blades of each pair are displaced one from the other approximately 180° circumferentially about the rotor, and each pair extends in generally oppositely curved, preferably helical, paths toward the center of the rotor. Blades of the first pair are displaced peripherally about the rotor from the second pair and the inner ends of the blades of the first pair are overlapped axially with respect to the inner ends of the blades of the second pair. Gaps separate the inner end portions of adjacent blades of opposite pairs and extend radially inward of the rotor to a substantial depth.

At the discharge end of the mixing chamber, a discharge or output portion of the mixer communicates directly with a discharge conduit, in sealed relationship. For compactness, the discharge conduit extends at right angles to the parallel bladed rotors.

A helical discharge screw fits closely within the discharge conduit and has a small lead relative to its diameter. As a result, the helical thread of the screw acts as an obstruction to material flow and controlled rotation of the screw controls the flow rate of material from the mixing chamber. This control is facilitated by the construction of the thread on the output portion of each parallel rotor just upstream from the discharge orifice which does not provide positive displacement, but rather permit the resistance established at the discharge orifice by the discharge screw to directly affect the pressure in the mixing chamber.

During mixing, temperatures of the material being mixed are typically increased as a result of mechanical working. With many materials, the temperature must be maintained below certain levels to prevent, for example, scorching, deterioration, or other undesirable effects. Temperature control within the mixing chamber and discharge conduit of the present invention is provided by drilled passageways in the wall portion of the mixing chamber parallel to the cylindrical portions in which the rotors turn, and in the wall portion of the apparatus defining the discharge conduit. Manifold chambers about the wall portions in which the drilled passageways extend circulate heat exchange fluid through the drilled passageways and facilitate a relatively high volume flow of heat exchange fluid closely adjacent the inner wall surfaces. This assures efficient transfer of heat and effectively controls the temperature of the material being mixed and discharged.

In the preferred embodiment, in which the discharge conduit and discharge control screw comprise an extruder, important advantages accrue by virtue of the integral construction. In such an integral, sealed, unit, the mixed material discharge from the continuous mixer is not subjected to contact with contaminants or with an oxidizing atmosphere as it otherwise might be during transportation between saparated mixers and extruder units. In addition, direct transfer conserves the heat normally lost in transporting material to an extruder remote from the mixer and the extruder can be somewhat smaller in size, since it is not necessary to heat the material an appreciable extent within the extruder. The typical initial working section of a conventional extruder can be omitted and only what are referred to as the transition section and metering section are required in this combination. It will readily be apparent that substantial savings in power consumption also result.

As a result of the above and other features, the present invention provides new and improved methods of and apparatus for continuously mixing materials such as rubber, plastic and the like. A general object of the present invention, then, is to provide a continuous internal mixing machine with two cylindrical chambers having charging and discharging openings to permit the continuous flow of material, two counter-rotating bladed rotors that mix material within the mixing chamber substantially without forcing the material from the chamber, a screw discharge control in a conduit for receiving material flowing through the mixing chamber, and means to rotate the discharge screw at a controlled speed to convey material away from the discharge opening of the mixing chamber and control the flow of material therethrough.

Another object of this invention is to provide a continuous internal mixing machine as in the preceding object, in which the through flow of material in the mixing chamber is controlled by an extruder that directly receives material from the discharge opening and which thereby provides an improved, efficient and integrated operation.

A further object of this invention is to provide improved methods of continuously mixing material such as rubber, plastics and the like, in which mixed material is continuously discharged by positive displacement at a rate independent of the pressure in the mixing chamber.

These and other objects, features and advantages of this invention will become more apparent as the invention becomes better understood from the following detailed description, when considered in connection with the accompanying drawings.

BRIEF DESCRIPTION OF THE DRAWINGS

FIG. 2 is a front elevational view of the apparatus of FIG. 1, with parts removed and parts in section;

FIGS. 3 and 3A are, together, a longitudinal sectional view of the continuous mixer shown in FIG. 1, taken along the line 3—3A;

DESCRIPTION OF A PREFERRED EMBODIMENT

Figures 1, 7:
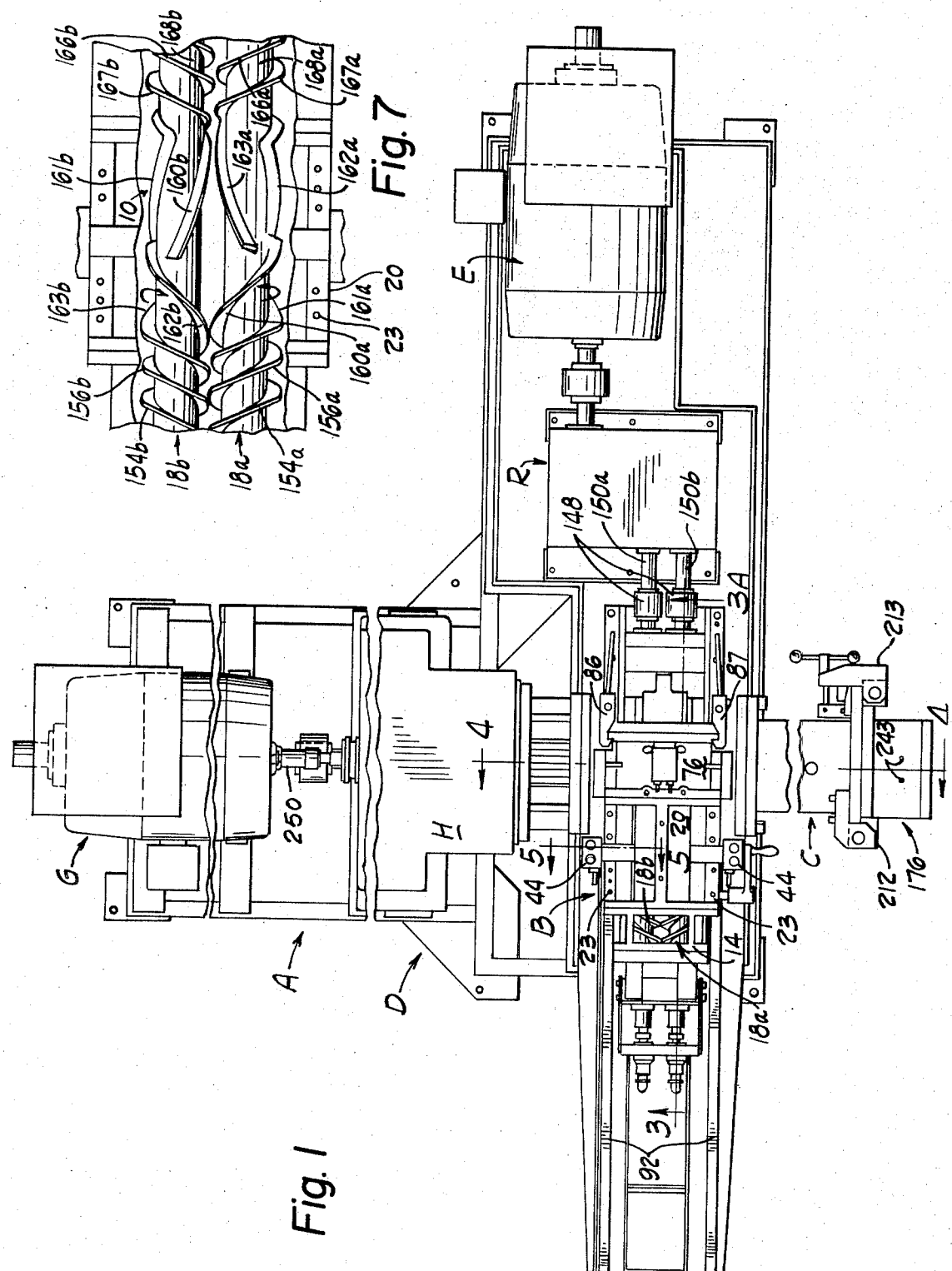
FIG. 1 is a plan view of a continuous internal mixing machine with a screw controlled discharge in the form of an extruder, embodying the present invention.
FIG. 7 is a partial plan view on an enlarged scale of the internal mixing machine as shown in FIG. 1, with parts removed and parts broken away to show the rotors within the continuous mixer.

With reference to the drawings, and particularly FIG. 1, a continuous internal mixer embodying the present invention is indicated generally by reference character A and includes an elongated mixer subassembly B, an extruder subassembly C integrally connected to the mixer subassembly and extending transversely thereof, and a common base D supporting the mixer and extruder subassemblies. Rotors of the mixer subassembly B are driven by a mixer drive E through a gear reducer R. Materials such as rubber, plastic and the like are mixed in subassembly B and discharged directly to the extruder subassembly C. A drive G operates the extruder subassembly C through a gear reducer H. The extruder subassembly C controls the through rate of material being mixed within the mixer subassembly, and further works and extrudes material received from the mixer subassembly.

Figure 3:
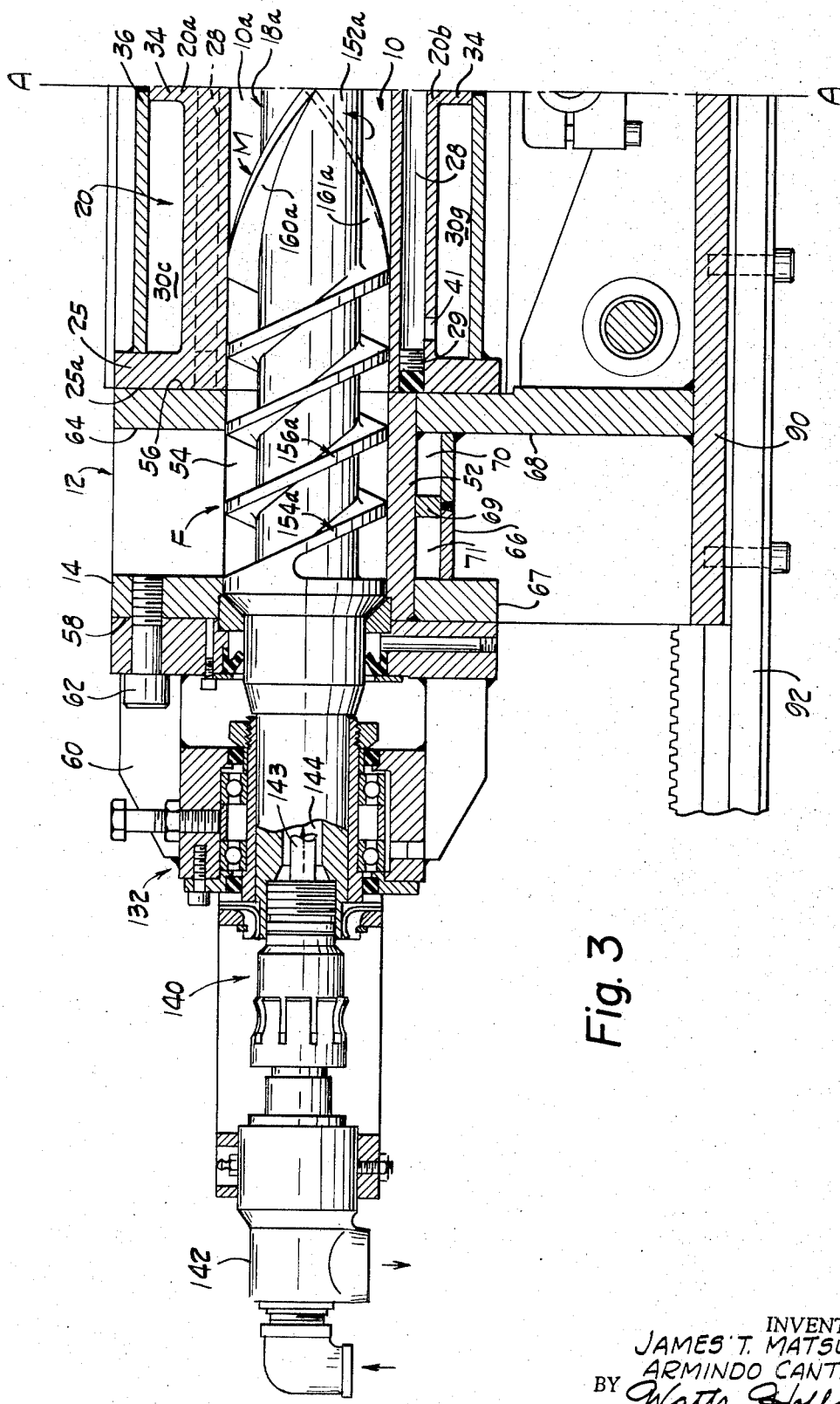
Figure 5:
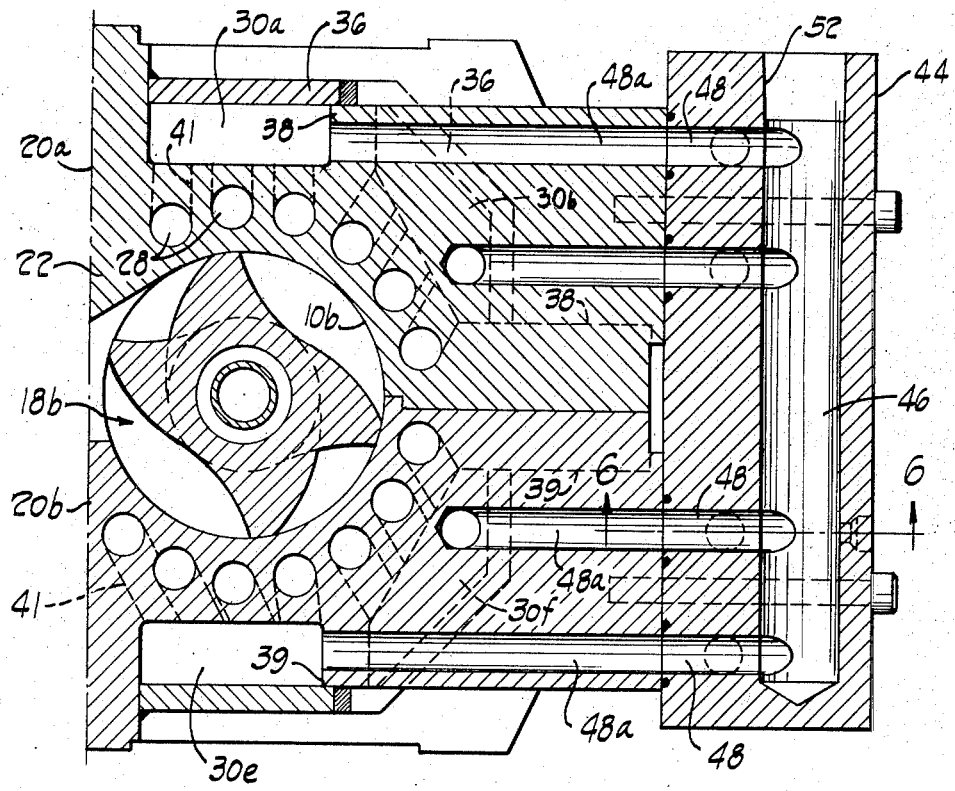
FIG. 5 is a partial sectional view of the cooling chamber manifold for the mixing chamber, taken along the line 5—5 of FIG. 1.

The mixer subassembly B includes a mixing chamber 10 with side-by-side, longitudinally communicating, generally cylindrical chamber portions 10a, 10b, the chamber 10a being shown in FIGS. 3 and 3A and the chamber 10b being a "mirror image" thereof, and shown in FIG. 5. The mixer has a product inlet opening at one end, indicated generally at 12, in a feed hopper housing or assembly 14 that communicates with both chamber portions 10a, 10b and which opens upward. A product discharge opening 16 communicates with the chamber portions 10a, 10b at the opposite end of the mixer and opens downward. Two rotors 18a, 18b extend through the mixing chamber 10, in side-by-side relationship, one in each generally cylindrical chamber portion 10a, 10b, and are driven in counter rotation by the mixer drive E through the reducer R. The rotors each extend beyond the mixing chamber, into the feed hopper at one end and over the discharge opening at the other end.

As best shown in FIGS. 1, 3, 3A and 5, the mixing chamber 10 is formed by a cast housing 20 with a curved wall-forming portion 22 providing generally cylindrical internal surfaces that define the mixing chamber part of the chamber portions 10a, 10b. The housing is split horizontally, with upper and lower portions 20a, 20b being secured together along horizontal flanges by cap screws 23 (see FIG. 1). The cast housing 20 terminates at opposite ends in flanges 25, 26 with flat end faces 25a, 26a. Parallel longitudinally extending drilled passages 28 are reformed within the wall 22 formed by each portion 20a, 20b of the housing 20, closely adjacent the inner forming surface. An open end of each passage 28 is closed by a plug 29. Outer manifold chambers 30 are formed on opposite lateral sides of the mixing chamber for the circulation of heat transfer fluid through the drilled passages 28. As best understood from FIG. 5, considered with FIGS. 3 and 3A, on each lateral side of the mixing chamber the upper housing 20a and lower housing 20b are divided longitudinally into inlet and outlet chambers by a vertical flange 34 that abuts outer plates 36, which are secured to the end flanges 25, 26, spaced from the wall 22. An axially extending divider wall 38 along the upper housing 20a, and a divider wall 39 along the lower housing 20b, further divide the inlet and outlet chamber manifolds to control the flow of heat transfer fluid through the plurality of drilled passages 28. Thus, two inlet manifold chambers 30a, 30b are provided in the upper housing 20a between the end flange 26 and the central flange 34. Two discharge manifold chambers, one of which is shown at 30c in FIG. 3, and which correspond to the inlet manifold chambers 30a, 30b are located between the central flange 34 and the end flange 25 of the cast housing section 20a. The lower housing section 20b is similarly divided into two inlet chamber manifolds 30e, 30f between the end flange 26 and central flange 34, and two discharge manifold chambers, one of which is shown at 30g in FIG. 3, between the central flange 34 and end flange 25, corresponding to the inlet manifold chambers 30e, 30f. The longitudinally extending drilled passages 28 communicate with the manifolds through apertures 40 at the inlet ends and 41 at the outlet ends.

Figure 6:
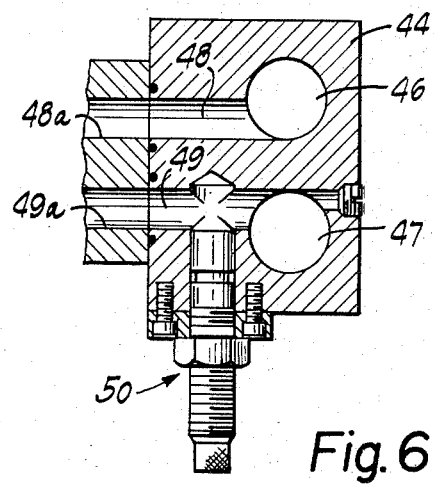
FIG. 6 is a sectional view of a portion of the cooling chamber manifold, taken along the line 6—6 of FIG. 5.

A distributor manifold 44 (FIGS. 1, 5 and 6) is secured to each side of the cast housing 20 and has two longitudinally spaced vertically disposed passages 46, 47 which, respectively, supply fluid to and exhaust fluid from the manifold chambers 30 through transverse passages 48, 49, which communicate with connecting passages 48a, 49a in the housing 20. One pair of transverse passages 48, 49 is associated with each manifold chamber 30. The respective outlet transverse passage 49 from each manifold section 30 includes a manifold valve 50 for controlling the flow of fluid. The vertical passages 46, 47 have ports 52 which connect to conduits (not shown) for supplying and exhausting heat transfer fluid to the distributor manifold 44.

The feed hopper 14 at the input end of the mixing chamber is a cast housing with a peripheral wall 52 that forms a chamber 54 with bottom and side cylindrically curved portions that are parts of the chamber portions 10a, 10b. The cast housing forms the inlet 12 to the chamber portions 10a, 10b, and has an end face 56 that abuts the end face 25a of the housing 20, an opposite end face 58 against which a bearing spider 60 is secured with cap screws 62 for supporting one end of the rotors 18, and an upwardly opening passageway 64 at the top of the machine. The lower portion of the hopper 14 includes a wall 66 that forms a jacket with longitudinally spaced transversely extending end walls 67, 68. A central divider wall 69 divides the jacket into an inlet chamber 70 and an outlet chamber 71 which communicate by passages (not shown) through the dividing wall 69. Conduits (not shown) supply and withdraw heat transfer fluid from the chambers.

The discharge opening 16 is formed by a cast housing 76 attached to the mixer housing 20 by cap screws at the end opposite from the feed hopper. The housing 76 has two longitudinally extending cylindrical chambers 78, 79 (see FIG. 4) that form parts of the chamber portions 10a, 10b. Opposite ends of the housing 76 have radial flanges 80, 81. The flange 80 abuts the end face 26a of the mixing chamber housing 20 and the opposite flange 81 abuts a fixed bearing housing 84. The flange 81 is detachably secured against the fixed bearing housing 84 by clamps 86, 87 (FIG. 1) and is maintained in alignment by locating dowels (not shown). This construction permits the hopper, mixing chamber and discharge housings to be moved as a unit relative to the rotors and extruder subassembly for cleaning or repair. For this purpose, the feed hopper, mixing chamber and discharge housings are supported on an auxiliary base 90 for sliding movement on parallel ways 92 on the main base D. Movement is facilitated by a hand crank 94 that drives a pinion 95 carried by the auxiliary base 90. The pinion 95 cooperates with a rack 96 along the ways 92 and permits the auxiliary base and supported housings to be moved from the position shown in solid in FIG. 2 to the position shown in phantom.

Figure 4:
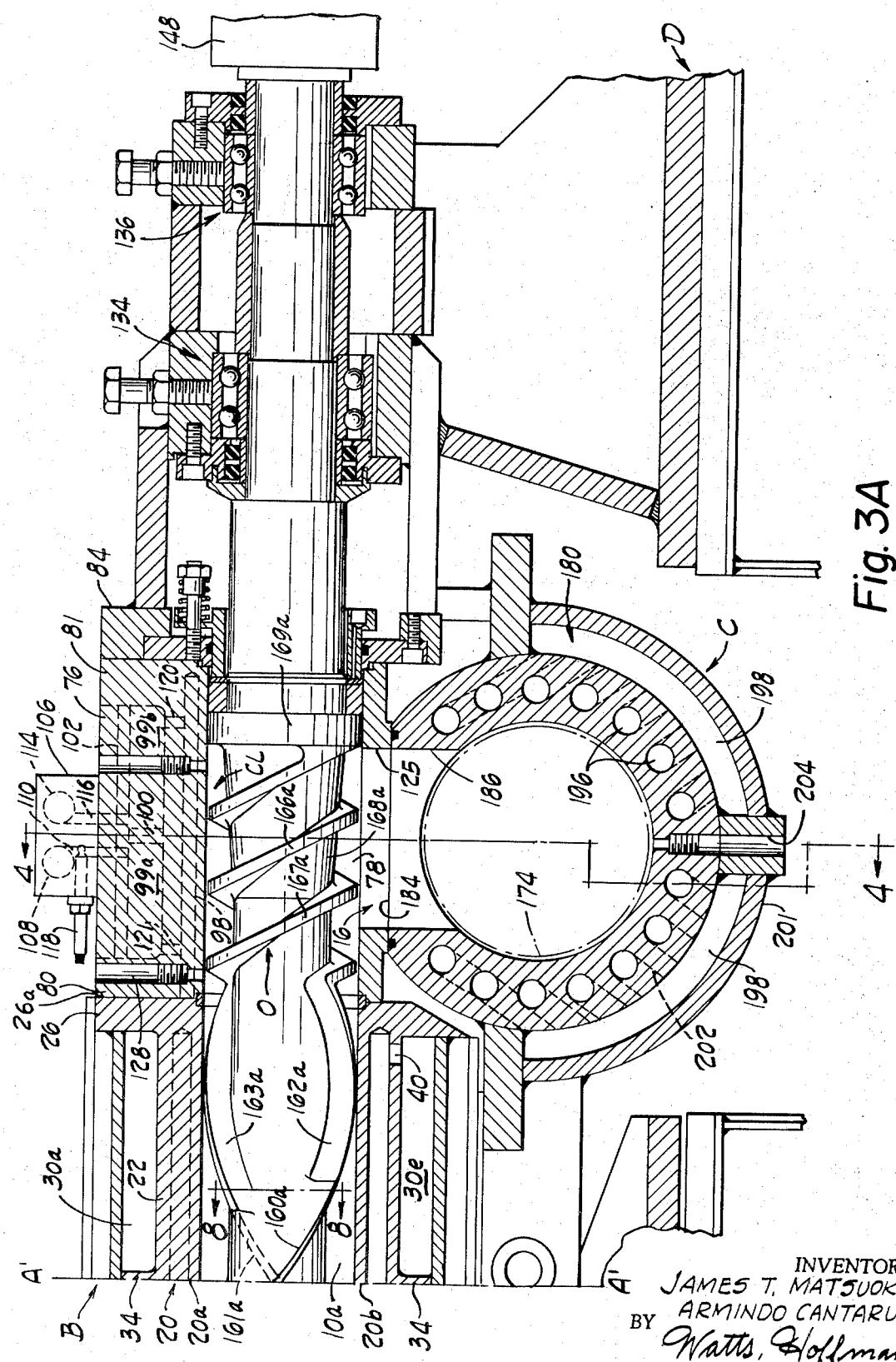
FIG. 4 is a longitudinal sectional view of the discharge control extruder of FIGS. 1 and 3A, taken along the line 4—4.

Drilled cooling passages 98 extend longitudinally through the housing 76, close to and radially spaced about the major portion of the cylindrical chambers 78, 79 for the circulation of heat transfer fluid. Two manifold chambers 99a and 99b are provided about the housing 76 adjacent opposite ends of the passages 98 on each lateral side of the housing 76. The chambers are formed between the end flanges 80, 81 by a central radial flange 100 and a cover plate 102 welded to the casting. The manifold chambers 99a on each lateral side of the housing 76 are separated by a central longitudinal flange 104 (FIG. 4). A manifold 106 has an discharge conduit 108 and two passages 110, 111 extending therefrom and communicating to the manifold chambers 99a. The manifold has an inlet conduit 114 that communicates through passages on the opposite side of the radial flange 100, to the manifold chambers 99b. One of such passages is shown at 116 in FIG. 3A. Flow is introduced to the manifold chambers 99b through the passages 116. Fluid from the manifold chambers 99b flows through drilled ports 120 in the housing to the drilled passages 98, and flows from the drilled passages 98 through drilled ports 121 to the manifold chambers 99a, and thence through the passages 110, 111 to the manifold 106. Flow is controlled by valves 118 in these passages. The manifold 106 is connected to an inlet conduit 122 and a discharge conduit 123 which supply and exhaust heat transfer fluid to the manifold.

Both cylindrical chambers 78, 79 communicate with a common opening 125 in the bottom of the housing 76. The opening 125, in turn communicates directly with the extruder subassembly C. Bores 128, 129 in the central upper portion of the housing 76 are provided to receive thermocouples for sensing the temperature of material within the chambers 78, 79.

The rotors 18a, 18b extend through the mixing chamber, feed hopper and discharge housings and extend at opposite ends beyond the feed hopper and discharge housings. The extending ends are journaled adjacent the feed housings 14 in bearing assembies 132 each supported by a spider 60, and adjacent the discharge housing 76 by fixed, aligned, bearing assemblies 134, 136. An adaptor assembly 140 is attached to the end of each rotor 18a, 18b adjacent the bearing housing 132 and is coupled to a rotary union 142, through which heat transfer fluid is supplied (as indicated by the flow arrows in FIG. 3) via a central pipe 143 to a central cavity 144 of the associated rotor and thence back through the rotary union. The opposite ends of the rotors 18a, 18b extend beyond the bearing assemblies 134, 136 and each is connected by a coupling 148 to a drive shaft 150a, 150b, respectively, from the gear reducer R.

Both rotors 18a, 18b are shown in FIG. 7 and are of similar construction, differing in that the screw threads and blades are twisted in opposite directions the longer blades are at different ends of the two rotor mixing portions, to provide the desired mixing action with counter rotation. Accordingly, only rotor 18a will be described in detail and rotor 18b will be described only to the extent necessary to point out the differences from rotor 18a.

Rotor 18a may be considered as having a central, generally cylindrical, body portion 152a with a feeding portion F in the feed hopper 14, a central mixing portion M in the mixing chamber 10, and an output portion O in the discharge housing 76. Helical threads 154a, 156a extend from the central body portion 152a and form a double thread screw of uniform lead and thread depth along the feeding portion F of the rotor. With a double thread screw, material to be mixed is divided and fed uniformly to each of two diametrically opposed mixing blades at the input end of the mixing section of each rotor. Similar helical threads 154b, 156b are on the rotor 18b, but twist in the opposite direction. Thus, both feeding portions F advance work product from the feed chamber 54 to the mixing chamber 10.

Each helical thread 154a, 156a terminates at a mixing blade of the mixing portion M of the rotor 18a. The mixing portion is constructed to thoroughly mix material within the chamber 10, blades of each rotor being constructed to act on the material in axially opposed directions in the mixing chamber. The blades themselves of the two rotors 18a, 18b, by virtue of oppositely twisting portions, have essentially no net screw action, yet produce a flow of material through the mixing chamber due to a progressive decrease in viscosity of the material from the inlet to the discharge end of the mixing chamber and hence a lowered resistance to flow in that direction, resulting from the progressively greater extent to which material downstream from the inlet has been worked. In a preferred construction shown, four blades are provided on each rotor 18a, 18b, and are arranged in pairs at opposite ends of the respective mixing portions. Thus, the rotor 18a has four blades 160a, 161a, 162a, 163a arranged in pairs 160a, 161a and 162a, 163a. The blades of each pair project from the central rotor body portion 152a in opposite directions (i.e., are 180° apart in a transverse plane). The pair of blades 160a, 161a is located at the feed end of the mixing portion M of the rotor and the pair of blades 162a, 163a is at the discharge end. Each blade of a pair curves or twists about the rotor body, preferably helically, from an end of the mixing portion toward the center, in the same direction as the other blade of the pair. The blades of one pair, however, twist or curve in an opposite direction about the rotor from the other pair, so that both pairs twist away from the direction of rotor rotation, considered in the direction from the opposite ends of the rotor toward the center of the mixing portion. The blades of one pair are displaced angularly from the blades of the other so that inner ends are peripherally spaced. Preferably the lengths of the blades are such that the inner ends overlap axially of the rotor. Thus, in the embodiment shown, the blades 160a, 161a are longer than the blades 162a, 163a, with the inner ends located beyond the center of the mixing portion M, toward the output portion O. Preferably, the inner ends of the blades 162a, 163a are also located to the same side of the center of the mixing portion as the inner ends of blades 160a, 161a. The angular displacement between the inner ends of adjacent blades provides gaps through which material being mixed can back-flow for remixing. The gaps extend radially inward to a depth that approximately corresponds to the peripheral extent of the basic cylindrical rotor body portion 152a. A rotor with four mixing blades of this general construction is disclosed in somewhat more detail in the copending application of James T. Matsuoka, entitled "Continuous Mixer," Ser. No. 758,195, filed Sept. 5, 1968, U.S. Pat. No. 3,565,403 and assigned to the assignee of this application, which disclosure is hereby incorporated herein by reference.

Figure 8:
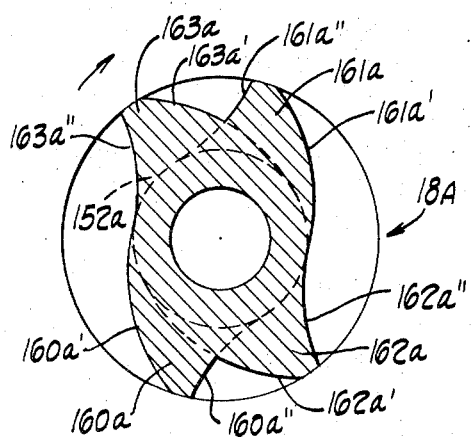
FIG. 8 is a sectional view of a rotor taken through the mixing chamber along the line 8—8 of FIG. 3A.

All the blades 160a–163a have a uniform angle, which is typically about 30° to 36° with reference to the axis of the rotor and can have a maximum angular displacement peripherally of the rotor body at the respective inner ends of adjacent blades 160a, 162a and 161a, 163a (and also at corresponding blade portions considered from the inner ends outward) of 90°. Preferably, the angular displacement is at least 20°. Each of the blades 160a–163a shown are of uniform cross section throughout their length, extend about 90° circumferentially about the rotor and each has a convex leading surface 160a'–163a' and a concave trailing surface 160a''–163a'' (see FIG. 8).

Blades 160b, 161b, 162b, 163b are provided on the rotor 18b. In addition to twisting in an opposite direction from the blades 160a–163a, the shorter blades 162b, 163b are adjacent the feeding portion F of the rotor, beside the longer blades 160a, 161a of the rotor 18a.

The material output portion O of the rotor 18a includes a double screw formed by helical threads 166a, 167a extending radially from a tapered body portion 168a. The helical screw blade 166a joins the mixing thread 162a at the juncture of the mixing portion M of the rotor, and the helical screw thread 167a joins the mixing blade 163. The tapered body portion 168a enlarges in cross section in the axial direction of material flow within the chamber 78 of the housing 76, thereby progressively diminishing the effective volume of the chamber 78. The screw diameter of the output portion O is somewhat smaller than that of the mixing threads 160a–163a, so that a significant clearance CL exists between the peripheries of the blades and the inner wall of the chamber 78. This clearance permits a backflow of material relative to forward screw action of the helical blades threads 166a, 167a, so that rotation of the rotor does not necessarily effect positive displacement of material in the chamber 78. The output portion O of the rotor terminates in an end shroud 169a that closes the end of the chamber 78, just beyond the opening 125 in the housing 76 that communicates to the extruder subassembly C. Helical threads 166b, 167b of the rotor 18b twist in an opposite direction from the threads 166a, 167a, and join the longer mixing blades 160b, 161b rather than the shorter. They are received in the chamber 79 next to chamber 78 and displace material through the opening 125 common to the chambers 78, 79.

The extruder subassembly C is comprised of a barrel 171 with a cylindrical chamber or conduit 172, a rotor or screw 174 within the chamber 172, the drive G connected to the rotor 174 and controllable to vary the speed of the rotor, and a die assembly 176 at the discharge end of the barrel. The barrel 171 extends transversely of the mixing chamber subassembly, is supported on the common base D, and includes a feed section and extrusion section (i.e., a pressure and metering section), as shown in FIG. 4.

The feed section of the extruder is formed of a generally cylindrical housing 180 carried by the support base D, with a central cylindrical passage 182 forming a part of the barrel chamber 172. An upper surface 184 of the housing 180 is flat and recessed to receive the discharge housing 76. A generally central, circular opening 186 in the upper surface of the housing 180 is located directly beneath the opening 125 in the discharge housing 76.

Radial flanges 188, 189 are at opposite ends of the feed section housing 180 and carry screw clamp assemblies 190, 191 at upper portions to secure the extruder feed housing 180 and the mixer discharge housing 76 together, sealed about the aligned openings 125, 186. The end flange 189 abuts and is secured to an adaptor 194 on the gear reducer H. The other flange 188 abuts and is secured to the extrusion section of the barrel 171. Drilled passages 196 extend longitudinally through the housing 180, adjacent the inner wall of the central cylindrical passage 182. The drilled passages are closed at opposite ends and heat transfer fluid is circulated through the drilled passages from inlet manifold chambers 198 to outlet manifold chambers 199 formed between the end flanges 188, 189 by a central radial flange 200 and cover plates 201. Apertures 202 each communicate from the inlet manifold chambers 198 to one end of a drilled passage 196, and apertures 203 each communicate between the outlet manifold chambers 199 and the opposite end of a drilled passage. Heat exchange fluid is introduced to the inlet manifold chamber 198 and is withdrawn from the discharge manifold chamber 199 through pipe couplings and conduits (not shown). A vertical bore 204 extends through the lower wall of the housing 180 directly beneath the opening 186 to receive a thermocouple for sensing the temperature of material discharged from the mixer.

The extrusion section of the barrel 171 includes a cylindrical barrel portion 205 with radial flanges 208, 209 at opposite ends. The flange 208 is secured to the flange 188 of the feed section housing by suitable cap screws 210 and the flange 209 abuts against and serves to secure the die assembly 176, which preferably is secured by a hinge 212 at one side to the flange 209 and is secured at the other side by a screw clamp 213 or the like (see FIG. 1). The barrel portion 205 has two temperature controlled zones provided by a plurality of axially extending, peripherally spaced, drilled passages 215 within the barrel wall adjacent the flange 208, and a plurality of similar drilled passages 216 adjacent the flange 209. Inlet and exhaust manifold chambers 218, 219 for passages 215 are formed between spaced radial flanges 220, 221 and between flange 221 and flange 208, by cover plates 222, 223. Fluid is supplied to the chamber 218 and exhausted from the chamber 219 through pipe fittings 224, 225 and flows from the chamber 218 to each passageway 215 through an associated aperture 226, and from the passages 215 to the exhaust manifold chamber 219 through an aperture 227. In a similar manner, heat transfer fluid is circulated through the drilled passages 216 from an inlet chamber 228 and an exhaust chamber 229 about the barrel formed, respectively, between flanges 220 and 230 and between the flange 230 and the end flange 209, by cover plates 232, 233. Fluid is introduced to the chamber 228 and exhausted form the chamber 229 through pipe fittings 234, 235 and flows from the inlet chamber 228 to each drilled passage 216 through an associated aperture 236 and from the drilled passages 216 to the discharge chamber 229 through apertures 237. Maximum heat transfer is achieved by locating the pipe fittings 224, 225 and 234, 235 adjacent the central dividing flange 221 or 230 so that heat transfer fluid circulates across the outer surface of the barrel 205 as well as through the drilled passages in the barrel wall. Bores 240, 241, 242 are provided at intervals along the length of the extruder barrel in the extrusion section for thermocouples and/or pressure sensors to monitor conditions of the material being extruded. Two similar bores 243 are provided in the die assembly 176 to receive pressure sensors for monitoring the pressure of the material within the die at two spaced locations across the width of the die.

The rotor or screw 174 of the extruder has a non-threaded portion 174a that extends rearwardly from the barrel through the adaptor 194 and which is keyed to a driven gear of the gear reducer H. The opposite end of the rotor terminates adjacent the die assembly 176. A central bore 245 extends the length of the rotor, open at the extending end and closed at the end adjacent the die assembly 176 by a plug 246. A feed pipe 248 is received in the open end of the bore and extends inward to a location adjacent the plug 246. A return pipe 249 extends from the open end of the central bore and surrounds the feed pipe 248, to provide a conduit for the outflow of heat transfer fluid supplied by the feed pipe 248 to the central cavity 245. Fluid is supplied and exhausted through a rotary union 250 (FIG. 1) connected to the outer ends of the pipes 248, 249.

A continuous helical thread 252 extends from a central body portion 254 of the extruder rotor 174 from a radial shroud 256 located just behind the inlet opening 186, to the end of the rotor adjacent the die assembly 176. The thread 252 is preferably of uniform pitch throughout its length, as shown, but alternatively can be of other conventional or modified design. The central body portion 254 is of uniform cross section in the extrusion section of the barrel 171, and is tapered in the feed section to gradually increase in cross section from the shroud 256 toward the extrusion section, thereby providing a gradually decreasing volume available to material progressing from the opening 186 to the extrusion section of the barrel 171. A screw collar 258 and seal 259 in addition to the shroud 256 close the rear end of the barrel chamber 172.

In operation, material to be mixed is introduced through the inlet 12 provided by the opening 64 to the feed hopper 14. The material is received by the feed portions F of the two counter rotating rotors 18a, 18b, which are driven at a suitable speed by the mixer drive E. Under proper operating conditions, the feed portions F advance the material to the mixing portions M of the rotors within the mixing chamber 10 under starved conditions. As material is continually fed to the mixing chamber 10, the blades of the mixing section M of each rotor work the material within the mixing chamber in a generally back and forth direction by virtue of the oppositely twisting blades on each rotor. In addition, the blades spread the material within the chamber against the inside surface thereof and shear the material between the blades and the chamber wall. The peripherally displaced inner ends of the blades of each rotor, by virtue of the axially overlapping relationship, permit a limited flow of material through the gaps between the inner ends so that the material will in part flow in a tortuous mixing path as it is worked by the blades. This provides an intermixing of the material on opposite sides of the blades.

Material being mixed within the mixing chamber progressively decreases in viscosity and, when opposed in its movement within the chamber by more viscous material introduced from the feed hopper and feed screws and moved forward by the mixing blades adjacent the mixing chamber inlet, flows from the mixing chamber to the chambers 78, 69 in the discharge housing 76. The work performed on the material in the mixing chamber by the rotors and the energy absorbed by the material and the increase in temperature thereof depends in part upon the pressure to which the material is subjected within the mixing chamber. This, in turn, depends upon the rate at which material is introduced to the mixing chamber and the resistance or back pressure established at the outlet to the mixing chamber.

Material advanced through the mixing chamber to chambers 78, 79 is moved by the helical threads 166, 167 of the output portions O of the rotors toward the ends of the chambers 78, 79 which are blocked by the rotor shrouds 169. The material is discharged transversely through the openings 125 and 186 to the discharge passage 182 in which the screw or rotor 174 operates. A downward component of force is exerted upon the material from the chambers 78, 79 toward the discharge passage 182 by virtue of the tapered body portions 168 of the output portions O of the mixing rotors.

The rotor 174 fits closely within the discharge conduit or passage 182, and exerts a very positive control over the flow of material therethrough. On the other hand the relatively large clearance gap CL between the helical threads 166, 167 of the mixing rotors and the surrounding chamber walls prevents the output portion O of the mixing rotors from producing a positive displacement of material in the chambers 78, 79. As a result, the resistance of the rotor 174 to the outflow of material is transmitted back to the mixing chamber 10 and affects the pressure that is developed therein by the rotor action and the rate of introduction of material to be mixed. The lead or pitch of the screw 252 of the rotor 174 is sufficiently small to prevent material from flowing to any significant degree along the screw rotor 174 without an accompanying rotation of the screw. Accordingly, the back pressure on the mixing chamber and the discharge rate are accurately controlled by the speed of rotation of screw rotor 174 under control of the variable speed drive motor G by virtue of a positive incremental discharge of material through the discharge conduit 182 established by the screw rotation.

In a preferred embodiment, as disclosed, the discharge control screw performs the further function of conditioning and extruding the material discharged from the continuous mixer subassembly. Because the material never leaves the machine, the direct transfer from the mixer subassembly to the extruder subassembly eliminates the loss of heat and the chance for contamination of material that typically accompany the transfer to material from a mixing machine to a separate extruder. Furthermore, the use of the extruder screw to control the discharge rate of the mixing machine eliminates the need for a separate control screw or other control mechanism, reducing the parts required. Power requirements are also reduced because the need for reworking mixed material to raise the material to the required temperature after loss of heat that accompanies transfer to a remote extruder is not necessary.

Rotation of the extruder screw 174 advances material from the feed section of the screw, which provides a progressively decreased volume for the material in the barrel as it advances toward the extruder die assembly 176. The material is advanced to the pressure and metering section or extrusion section, where it is forced under pressure through an extruder die assembly 176.

The temperature of the material being mixed and extruded can be controlled throughout the machine, by the flow of heat transfer fluid through the drilled passages closely adjacent the inside surfaces of the various chambers, as already described in detail. The independent control of supply and exhaust of heat transfer fluid to the various chambers permits maximum temperature control and flexibility to establish the required temperature at different locations within the machine.

Typically, the temperature of the material being mixed is an indication of energy absorbed and hence an indication of the intensity of the mixing. The mixing intensity is a function of both the rotor speed and the pressure on the material within the mixing chamber. The temperature of the material being discharged or the pressure within the mixer can be measured by suitable thermocouples or pressure sensors, such as may be positioned in the bores 128, 129 of the discharge housing 76 to give an indication of the mixing intensity. Thus, the measured temperature of the material, being an indication of the mixing intensity, can be used to indicate whether uniform and adequate mixing takes place. Changes in the mixing intensity to which the material being mixed and discharged is subjected can be made by adjusting the speed of rotation of the discharge control screw 174, and this will result in an accompanying change in the temperature of the material discharged. Decreased speeds results in greater mixing intensity and higher discharge temperatures. Such changes can be made manually by an operator after observing the temperature of the material being discharged or by observing the pressure in the mixing chamber, or can be made automatically through a conventional motor control for the drive motor of the discharge screw, actuated by temperature or pressure sensors. Thus, while the rotor rotation will typically be set to establish a desired intensity of mixing, adjustments in mixing intensity can be made through control of the discharge rate in response to either temperature measurements of discharged material or pressure measurements within the mixer.

Controlled rotation of the screw 174 readily and accurately controls the material discharge rate virtually independent of typical viscosity changes in the material or of any tendency of the material to adhere to the discharge passageway. Thus, a slight change in the temperature of the material at the discharge and accompanying change in viscosity does not immediately affect the rate of discharge flow and hence the pressure within the mixing chamber.

Typically, the rotational speed of the discharge screw is correlated with the rate of material input to the mixing chamber so that the mixing chamber does not become overloaded with material and interfere with the desired starved feeding conditions, i.e., the material should not back up into and pack the feeding portions F of the rotors.

As described above, an internal mixer with parallel mixing rotors and a screw controlled discharge has been provided in which the material throughput is affected by operation of a screw in a discharge conduit connected to the mixing chamber. In the preferred embodiment, the discharge control screw additionally operates upon the discharged material to extrude the material through a die, reducing total power requirements, permitting a reduction in the overall length of the extruder required, and eliminating chances of contamination of the mixed material during transfer to the extruder.

While a preferred embodiment and mode of operation of this invention have been described in detail, it will be apparent that various modifications or alterations may be made therein, without parting from the spirit and scope of the invention.

What is claimed is:

1. In a continuous internal mixer: structure forming a mixing chamber with a wall portion defining two interconnected substantially cylindrical parallel portions; two bladed rotors, one in each cylindrical portion of the mixing chamber and supported for rotation therein and each having a central portion in the mixing chamber with blade portions orientated more lengthwise of the axis of the rotor than circumferentially thereof and twisting in opposite directions for mixing material within the chamber; a charging opening to said mixing chamber adjacent one end thereof; a discharge opening from said mixing chamber adjacent an end opposite from the charging opening; means on said rotor adjacent the charging opening for introducing material into the mixing chamber; structure forming a material receiving conduit, with a wall portion defining a cylindrical passageway, said conduit being adjacent the mixing chamber in direct communication with said discharge opening for receiving material advanced under pressure through the mixing chamber and through the discharge opening; a rotatable screw in said receiving conduit closely received within the cylindrical portion to control flow of material from mixing chamber into and through the conduit; means to rotate said screw at a controlled rate to convey material away from the discharge opening of the mixing chamber; drilled passageways in said wall portion defining the substantially cylindrical parallel portions of the mixing chamber, extending axially of the cylindrical portions, and manifold chambers about said wall portion circulating heat exchange fluid through said drilled passageways; and drilled passageways in said wall portion defining the cylindrical passageway, extending axially thereof, and manifold chambers about said last-mentioned wall portion for circulating heat exchange fluid through said last-mentioned drilled passageways.

2. In a continuous internal mixer: structure forming a mixing chamber having two interconnected substantially cylindrical parallel portions; two bladed rotors, one in each cylindrical portion of the mixing chamber, supported for rotation therein and each having a central portion in the mixing chamber with blade portions orientated more lengthwise of the axis of the rotor than circumferentially thereof and twisting in opposite directions to mix material in the mixing chamber; a first opening to said mixing chamber adjacent one end thereof through which material to be mixed is charged; a second opening from said mixing chamber adjacent an end opposite from said first opening through which mixed material is discharged; a first screw portion on each of said bladed rotors adjacent said first opening adapted to advance material to said mixing chamber; a second screw portion on each of said bladed rotors adjacent an opposite end of the rotor from the first screw portion and adjacent said second opening, said second screw portions having substantial peripheral clearance relative to a surrounding chamber portion; structure forming a material receiving conduit, at least a portion of which is cylindrical, in communication with said second opening for receiving material advanced under pressure through the mixing chamber and said second opening; a rotatable screw extending axially in said receiving conduit closely received within the cylindrical portion to control flow of material from the mixing chamber into and through the conduit; and means to rotate said screw at a controlled rate to convey material away from said second opening.

3. In a continuous internal mixer: structure forming a mixing chamber having two interconnected substantially cylindrical parallel portions; two bladed rotors, one in each cylindrical portion of the mixing chamber, supported for rotation therein and each having a central portion in the mixing chamber with blade portions orientated more lengthwise of the axis of the rotor than circumferentially thereof and twisting in opposite directions to mix material in the mixing chamber; a first opening to said mixing chamber adjacent one end thereof through which material to be mixed is charged; a second opening from said mixing chamber adjacent an end opposite from said first opening through which mixed material is discharged; a first screw portion on each of said bladed rotors adjacent said first opening adapted to advance material to the central bladed portion; a second screw portion on each of said bladed rotors adjacent said second opening, adapted to aid in discharging material from the mixing chamber said second screw portions having substantial peripheral clearance relative to a surrounding chamber portion; structure forming a material receiving conduit, at least a portion of which is cylindrical, in communication with said second opening for receiving material advanced through the mixing chamber and second opening, and having a discharge end and an extrusion die at said end; a rotatable screw extending axially in said receiving conduit closely received within the cylindrical portion to control flow of material from the mixing chamber into and through the conduit, and constructed to further condition said material through rotation of said screw; means to rotate said screw at a controlled rate to convey material away from said second opening and to force said material axially along the conduit and through said extrusion die; drilled passageways in said wall portion defining the substantial cylindrical parallel portions of the mixing chamber, extending axially of the cylindrical portions, and manifold chambers about said wall portion for circulating heat exchange fluid through said drilled passageways; and drilled passageways in said wall portion defining the cylindrical portion of said conduit, extending axially thereof, and manifold chambers about said last-mentioned wall portion for circulating heat exchange fluid through said last-mentioned drilled passageways.

4. In a continuous internal mixer: structure forming a mixing chamber having two interconnected substantially cylindrical parallel portions; two bladed rotors, one in each cylindrical portion of the mixing chamber, supported for rotation therein and each having a central portion in the mixing chamber with blade portions that twist in opposite directions to mix material in the mixing chamber, said blade portions of at least one of said rotors having first and second pairs of blades formed in a generally continuous rotor surface and extending inward from adjacent opposite ends of the rotor, the blades of each pair being displaced one from the other approximately 180° circumferentially about the rotor, each pair extending in a generally opposite helical path toward the center of the rotor, the blades of the first pair being displaced peripherally about the rotor from the second pair, with the inner ends of the blades of the first pair being overlapped axially with respect to the inner ends of the blades of the second pair; a first opening to said mixing chamber adjacent one end thereof through which material to be mixed is charged; a second opening from said mixing chamber adjacent an end opposite from said first opening through which mixed material is discharged; a screw feed portion on each of said bladed rotors adjacent said first opening adapted to advance material to the central bladed portion; structure forming a material receiving conduit, at least a portion of which is cylindrical, in communication with said second opening for receiving material advanced under pressure through the mixing chamber and second opening; a rotatable screw extending axially in said receiving conduit closely received within the cylindrical portion and extending substantially the length thereof to control flow of material from the mixing chamber into and through the conduit; and means to rotate said screw at a controlled rate to convey material away from said second opening of the mixing chamber.

5. In a continuous internal mixer: structure forming a mixing chamber having two interconnected substantially cylindrical parallel portions; two bladed rotors, one in each cylindrical portion of the mixing chamber, supported for rotation therein and each having a central portion in the mixing chamber with blade portions that twist in opposite directions to mix material in the mixing chamber, the bladed portions of at least one of said rotors having first and second pairs of blades formed in a generally continuous rotor surface and extending inward from adjacent opposite ends of the rotor, the blades of each pair being displaced one from the other approximately 180° circumferentially about the rotor, each pair extending in a generally opposite helical path toward the center of the rotor, the blades of the first pair being displaced peripherally about the rotor from the second pair, with the inner ends of the blades of the first pair being overlapped axially with respect to the inner ends of the blades of the second pair; a first opening to said mixing chamber adjacent one end thereof through which material to be mixed is charged; a second opening from said mixing chamber adjacent an end opposite from said first opening through which mixed material is discharged; a first screw portion on each of said bladed rotors adjacent said first opening adapted to advance material to the central bladed portion; a second screw portion on each of said bladed rotors adjacent an opposite end of the rotor from the first screw portion and adjacent said second opening, said second screw portion having substantial peripheral clearance relative to a surrounding chamber portion; structure forming a material receiving conduit, at least a portion of which is cylindrical, in communication with said second opening for receiving material advanced under pressure through the mixing chamber and second opening; a rotatable screw extending axially in said receiving conduit closely received within the cylindrical portion and extending substantially the length thereof to control flow of material from the mixing chamber into and through the conduit; and means to rotate said screw at a controlled rate to convey material away from said second opening of the mixing chamber.

6. In a continuous internal mixer: structure forming a mixing chamber having two interconnected substantially cylindrical parallel portions; two bladed rotors, one in each cylindrical portion of the mixing chamber, supported for rotation therein and each having a central portion in the mixing chamber with blade portions that twist in opposite directions to mix material in the mixing chamber, the bladed portions of at least one of said rotors having first and second pairs of blades formed in a generally continuous rotor surface and extending inward from adjacent opposite ends of the rotor, the blades of each pair being displaced one from the other approximately 180° circumferentially about the rotor, each pair extending in a generally opposite helical path toward the center of the rotor, the blades of the first pair being displaced peripherally about the rotor from the second pair, with the inner ends of the blades of the first pair being overlapped axially with respect to the inner ends of the blades of the second pair; a first opening to said mixing chamber adjacent one end thereof through which material to be mixed is charged; a second opening from said mixing chamber adjacent an end opposite from said first opening through which mixed material is discharged; a first screw portion on each of said bladed rotors adjacent said first opening adapted to advance material to the central bladed portion; a second screw portion on each of said bladed rotors adjacent an opposite end of the rotor from the first screw portion and adjacent said second opening, said second screw portions having substantial peripheral clearance relative to a surrounding chamber portion; structure forming a material receiving conduit, at least a portion of which is cylindrical, in communication with said discharge opening for receiving material advanced under pressure through the mixing chamber and second opening, and having a discharge end and an extrusion die at said end; a rotatable screw extending axially in said receiving conduit closely received within the cylindrical portion and extending substantially the length thereof to restrict flow of material from the mixing chamber into and through the conduit and constructed to further condition said material through rotation of said screw; means to rotate said screw at a controlled rate to convey material away from said second opening of the mixing chamber and to force said material axially along the conduit and through said extrusion die.

7. In a method of continuously mixing material such as rubber, plastics, and the like, the steps comprising: introducing material to be mixed into a mixing chamber and adjacent one end of a pair of adjacent generally coextensive rotors each having bladed portions twisting in opposite directions, rotating the rotors in opposite directions to mix the material, continuously advancing the material along the rotors toward a discharge passageway from the mixing chamber, restricting movement of material through the discharge passageway by a material moving means offset from the axes of the rotors and operative to positively convey material from the discharge passageway, sensing pressure within the mixing chamber, and varying the speed of said material moving means to maintain optimum pressure in the mixing chamber.

8. In a method of continuously mixing material such as rubber, plastics, and the like, the steps comprising: introducing material to be mixed into a mixing chamber and adjacent one end of a pair of adjacent generally coextensive rotors each having blade portions that are oriented more lengthwise of their axis of rotation than circumferentially and twist in opposite directions, rotating the rotors in opposite directions to mix the material, continuously advancing the material along the rotors into a conduit in an extruder housing which conduit is connected with the mixing chamber and is radially offset from and extends transversely of the axis of the rotors, controlling the rate of flow of material from the mixing chamber by controlling the throughput of the extruder by varying the speed of rotation of an extruder screw in the conduit, and circulating a heat exchange fluid through passages in the walls of the mixing chamber and extruder housing to control the temperature of material being mixed.

9. In a method of continuously mixing material such as rubber, plastics, and the like, the steps comprising: introducing material to be mixed into a mixing chamber and adjacent one end of a pair of adjacent generally coextensive rotors, rotating the rotors to mix the materials, advising the material under pressure along the rotors toward a discharge passageway from the mixing chamber, restricting movement of material through the discharge passageway while concurrently and positively conveying incremental portions of material from the discharge passageway, sensing the temperature of the material advanced from the mixing chamber and establishing a desired temperature by changing the rate at which material is conveyed from the discharge passageway.

10. In a continuous internal mixer: a structure forming a mixing chamber having two interconnected substantially cylindrical parallel portions; two rotors, one supported by bearings adjacent opposite ends thereof for rotation in each cylindrical portion of the mixing chamber and each having in the mixing chamber a central portion with blade portions oriented more lengthwise of the axis of the rotor than circumferentially thereof and twisting in opposite directions less than 180° about the axis of the rotor to mix material in the mixing chamber; each of said blade portions having convex leading surfaces; said oppositely twisting blade portions of each rotor extending inwardly from adjacent opposite ends of the mixing chamber toward the center of the rotor in generally helical paths; means for rotating said rotors in opposite directions; a first opening to said mixing chamber adjacent one end thereof through which material to be mixed is charged and a second opening from said mixing chamber adjacent an end opposite from said first opening through which mixed material is discharged; said second opening being located between said bearings; a screw portion on each of said rotors adjacent said first opening adapted to advance material to the central bladed portion of said rotors; structure forming a material receiving conduit, at least a portion of which is cylindrical, in communication with said second opening and radially offset from and extending transversely of the axes of the rotors for receiving material from said mixing chamber; passages in the structure forming said mixing chamber for the circulation of heat exchange medium therethrough; passages in the structure forming said material receiving conduit for the circulation of heat medium therethrough; a rotatable screw extending axially in said receiving conduit closely received within the cylindrical portion to control the flow of material from the mixing chamber into and through said conduit; and means to rotate said screw at a controlled rate to convey material away from said discharge opening.

11. In a continuous internal mixer; a structure forming mixing chamber having two interconnected substantially cylindrical parallel portions; two rotors, one supported for rotation in each cylindrical portion of the mixing chamber and each having in the mixing chamber blade portions that twist in opposite directions less than 180° about the axis of the rotor to mix material in the mixing chamber; means for rotating said rotors in opposite directions; a first opening to said mixing chamber adjacent one end thereof through which material to be mixed is charged and a second opening from said mixing chamber adjacent an end opposite from said first opening through which mixed material is discharged; a first screw portion on each of said rotors adjacent said first opening adapted to advance material to the central bladed portion of said rotors; a second screw portion on each of said rotors adjacent an opposite end of the rotor from the first screw portion and adjacent said second opening, said second screw portion having substantial peripheral clearance relative to a surrounding chamber portion; structure forming a material receiving conduit, at least a portion of which is cylindrical, in communication with said discharge opening and offset from and extending transversely of the axes of the rotors for receiving material from said mixing chamber; passages in the structure forming said mixing chamber for the circulation of heat exchange medium therethrough; passages in the structure forming said material receiving conduit for the circulation of heat medium therethrough; a rotatable screw extending axially in said receiving conduit closely received within the cylindrical portion to control the flow of material from the mixing chamber into and through said conduit; and means to rotate said screw at a controlled rate to convey material away from said discharge opening.

12. In a continuous internal mixer: a structure forming mixing chamber having two interconnected substantially cylindrical parallel portions; two rotors, one rotatable in each cylindrical portion of the mixing chamber and having blade portions that twist in opposite directions to their axes of rotation for mixing material in said mixing chamber; means forming a first opening to said mixing chamber adjacent one end thereof through which material to be mixed is charged; a second opening from said mixing chamber adjacent to the end thereof remote from said first opening through which mixed material is discharged; means supporting said structure and said rotors for relative movement axially of said rotors; means for rotating said rotors in opposite directions; means forming a material receiving conduit in communication with said second opening and offset from the axes of said rotors; a rotatable screw extending axially in said receiving conduit to control the flow of material from said mixing chamber into and through said conduit; and means to rotate said screw at a controlled rate.

13. In a continuous internal mixer: a structure forming mixing chamber having two interconnected substantially cylindrical parallel portions; two rotors, one rotatable in each cylindrical portion of the mixing chamber and having blade portions that twist in opposite directions to their axes of rotation for mixing material in said mixing chamber; a first opening to said mixing chamber adjacent one end thereof through which material to be mixed is charged; a second opening from said mixing chamber adjacent to the end thereof remote from said first opening through which mixed material is discharged; means supporting said structure and said rotors for relative movement axially of said rotors; means connected to the ends of said rotors remote from said first opening for rotating said rotors in opposite directions; means forming a material receiving conduit in communication with said second opening and offset from the axes of said rotors; a rotatable screw extending axially in said receiving conduit to control the flow of material from said mixing chamber into and through said conduit; and means to rotate said screw at a controlled rate.

14. In a continuous internal mixer: a structure forming mixing chamber having two interconnected substantially cylindrical parallel portions and a material inlet opening adjacent to one end of the chamber; two rotors one rotatable in each cylindrical portion of the mixing chamber and having blade portions in said cylindrical portions of said mixing chamber that twist in opposite directions to their axes of rotation for mixing material in said mixing chamber; a material discharge opening adjacent to the end of said mixing chamber remote from said inlet opening through which mixed material is discharged; means supporting said structure for movement axially of said rotors; and means connected to the ends of said rotors remote from said first opening for rotating said rotors in opposite directions; means forming a material receiving conduit in communication with said discharge opening and offset from the axes of the rotors; a rotatable screw extending axially in said receiving conduit to control the flow of material from the mixing chamber into and through the conduit; and means to rotate said screw at a controlled rate.

15. In a continuous internal mixer: a structure forming mixing chamber having two interconnected substantially cylindrical parallel portions; two rotors, one rotatable in each cylindrical portion of the mixing chamber and having blade portions that twist in opposite directions to their axes of rotation for mixing material in said mixing chamber; a first opening to said mixing chamber adjacent one end thereof through which material to be mixed is charge; a second opening from said mixing chamber adjacent to the end thereof remote from said first opening through which mixed material is discharged; means supporting said structure and said rotors for relative movement axially of said rotors; drive means for rotating said rotors in opposite directions; means stationary with respect to said drive means forming a material receiving conduit in communication with said second opening and offset from the axes of said rotors; a rotatable screw extending axially in said receiving conduit to control the flow of material from said mixing chamber into and through said conduit; and means to rotate said screw at a controlled rate.

16. In a continuous internal mixer: structure forming a mixing chamber having a material feeding opening adjacent one end; a rotor supported by bearings adjacent opposite ends thereof for rotation in said mixing chamber and having in the mixing chamber a central portion with blade portions orientated more lengthwise of the axis of the rotor than circumferentially thereof and twisting in opposite directions less than 180° about the axis of the rotor for mixing material in said mixing chamber; each of said blade portions having convex leading surfaces; said oppositely twisting blade portions extending inwardly from adjacent opposite ends of the mixing chamber toward the center of the rotor in generally helical paths, means for rotating said rotor at a controlled speed; structure forming a material conveying conduit, at least a portion of which is cylindrical, adjacent the end of said mixing chamber opposite said material receiving opening in communication with the mixing chamber at a location between said bearings and radially offset from and extending transversely of the axis of said mixing chamber; said structure forming said mixing chamber having passageways therein for the circulation of heat exchange medium closely adjacent the interior wall of said mixing chamber; said structure forming said conduit having passageways therein for the circulation of heat exchange medium closely adjacent the interior wall of said conduit; a rotatable screw extending axially in said conduit closely received in the cylindrical portion to control flow of material from the mixing chamber into and through the conduit, said screw being rotatably supported in said conduit with its axis offset from the axis of said rotor; and means to rotate said screw at a controlled speed to convey material away from the mixing chamber.

17. In a continuous internal mixer: structure forming a mixing chamber; a bladed rotor supported for rotation in said mixing chamber and having in the mixing chamber first and second pairs of blade portions each having a convex leading surface and each pair extending in generally opposite helical paths more lengthwise than circumferentially of the axis of the rotor from opposite ends of the mixing chamber toward the center thereof; said mixing chamber having an opening adjacent one end through which material to be mixed is fed thereto; a double-thread screw feed portion on said rotor in advance of said blade portions; each of said double threads of said screw feed portion terminating at and connected with one of said pair of blade portions adjacent said screw feed; structure forming a material receiving conduit extending transversely of said mixing chamber and in communication with the end of said mixing chamber opposite said opening through which material is fed thereto for receiving mixed material from said mixing chamber; a rotatable screw in said receiving conduit with its axis offset from the axis of said rotor for controlling flow of material from the mixing chamber into and through said conduit; and means to rotate said screw.

18. In a method of continuously mixing materials such as rubber, plastics, and the like, the steps comprising: introducing material to be mixed into one end of a mixing chamber and adjacent one end of a pair of adjacent generally coextensive rotors rotatable therein and each having first and second pairs of blades, each having a convex leading surface and each pair extending in generally opposite helical paths more lengthwise than circumferentially of the axis of the rotors from opposite ends of the mixing chamber towards the center thereof, the blades of each pair being displaced from one another about 180° circumferentially of the rotor and the blades of one pair being displaced circumferentially about the rotor from the other pair with adjacent ends overlapping; rotating the rotors in opposite directions to mix the material and advance it along the rotors to a screw in a conduit communicating with the end of the mixing chamber opposite the end into which the material is introduced and offset from and extends transversely to the axes of the rotors; controlling the rate of flow of material from the mixing chamber by controlling the speed of rotation of the screw, and circulating a heat exchange fluid through passages in the walls of the mixing chamber and the screw housing to control the temperature of material being mixed.

* * * * *